United States Patent [19]

Desai et al.

[11] 4,116,965
[45] Sep. 26, 1978

[54] STYRYL DYESTUFFS CONTAINING CERTAIN AMINO, CYANOPYRIDINE MOIETIES

[75] Inventors: Nalin Binduprasad Desai, Bombay, India; Visvanathan Ramanathan, Basel, Switzerland

[73] Assignee: Ciba-Geigy Corporation, Ardsley, N.Y.

[21] Appl. No.: 742,924

[22] Filed: Nov. 18, 1976

Related U.S. Application Data

[63] Continuation of Ser. No. 566,498, Apr. 9, 1975, abandoned.

[30] Foreign Application Priority Data

Apr. 10, 1974 [CH] Switzerland .................. 5069/74

[51] Int. Cl.$^2$ .......................................... C07D 213/57
[52] U.S. Cl. ................. 260/294.9; 544/121; 544/360; 544/365; 544/82; 260/268 H; 260/293.69; 260/294.8 R; 260/294.8 F; 260/294.8 G; 8/1 D; 542/427; 542/438; 542/405
[58] Field of Search ...................................... 260/294.9

[56] References Cited

U.S. PATENT DOCUMENTS 4,033,943  7/1977  Ramanathan et al. ............ 260/294.9

*Primary Examiner*—Alan L. Rotman
*Attorney, Agent, or Firm*—Edward McC. Roberts; Prabodh I. Almaula

[57] ABSTRACT

A styryl dye devoid of acid, water-solubilizing groups, of the formula

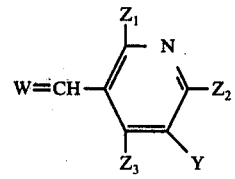

wherein two radicals Z represent groups of the formula —NR'R" and one Z represents a group of the formulae —NR'R", —OR''' or —S—R''', in which each of R', R" and R''' represents hydrogen unsubstituted phenyl, substituted phenyl, benzyl, phenylethyl, cyclohexyl, or an aliphatic radical containing up to 8 carbon atoms and R' and R''' are able to form a ring containing the amino nitrogen and the radicals —NR'R" may be the same or different, Y represents a radical of the formula —CN or —CONH$_2$, and W represents the radical of an organic compound, which contains an active methylene group and which is bonded to the —CH= group through the carbon atom of the active methylene group, and $Z_3$ is furthermore an unsubstituted or a substituted hydrocarbon radical containing up to 8 carbon atoms.

12 Claims, No Drawings

STYRYL DYESTUFFS CONTAINING CERTAIN AMINO, CYANOPYRIDINE MOIETIES

This is a continuation of application Serial No. 566,498, filed on Apr. 9, 1975, now abandoned.

The present invention provides useful new styryl dyestuffs which do not contain any acid water-solubilising groups, in particular sulphonic acid groups, and which have the formula

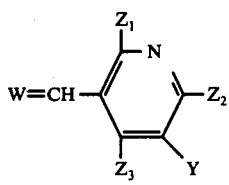

wherein two radicals Z represents groups of the formula —NR'R" and one radical Z represents a group of the formulae —NR'R", —OR''' or —S—R''', in which each of R', R" and R''' represents hydrogen, aryl, aralkyl, cycloalkyl, or an aliphatic radical, and R' and R" are able to form a ring which contains the amino nitrogen, Y represents a radical of the formulae —CN or —CONH$_2$, and W represents the radical of an organic compound which contains an active methylene group and which is bonded to the —CH= group through the carbon atom of the active methylene group, and Z$_3$ is furthermore an unsubstituted or a substituted hydrocarbon radical.

The new dyestuffs are obtained by reacting an aldehyde of the formula

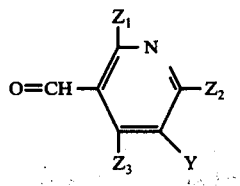

wherein Z$_1$, Z$_2$, Z$_3$ and Y have the meanings given hereinbefore, with a compound which contains a reactive methylene group and has the formula WH$_2$, in which W has the meaning previously assigned to it, and, optionally, if Y=CN, by converting the cyano group with concentrated sulphuric acid to the —CONH$_2$ group, and/or quaternising the resulting dyestuff, if this contains quaternisable nitrogen atoms, by treatment with alkylating.

According to another modification of the process, the new dyestuffs are obtained by reacting the compounds of the formula

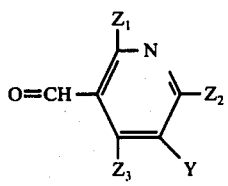

with 1-chloro-2,2-dicyanoethylene in the presence of acid acceptors.

Dyestuffs which constitute preferred embodiments of the invention are those of the formulae

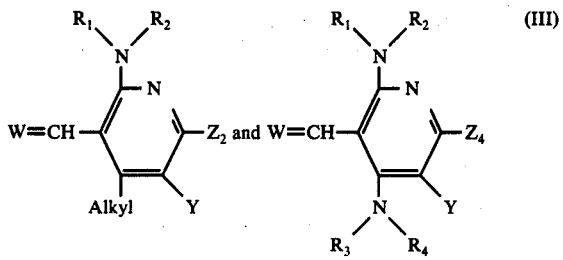

wherein each of R$_1$, R$_2$, R$_3$ and R$_4$ represents hydrogen, an aryl, aralkyl, cycloalkyl or an aliphatic radical, and R$_1$ with R$_2$ and R$_3$ with R$_4$ are able to form a ring which contains the amino nitrogen, and Z$_2$ has the meaning given above, and wherein Z$_4$ represents a radical of the formula

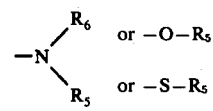

wherein each of R$_5$ and R$_6$ each represents hydrogen, aryl, arlakyl, cycloalkyl radicals or an aliphatic radical, and R$_5$ and R$_6$ can be attached to a heterocycle which contains the amino nitrogen, and, in particular, by dyes in which Y is a cyano group.

By the unsubstituted or substituted hydrocarbon radical and by aryl, aralkyl, cycloalkyl radicals and aliphatic radicals are meant preferably radicals of the benzene class, benzyl, phenethyl, cyclohexyl, or alkyl radicals with at most 12 carbon atoms, which last named radicals may be interrupted by oxygen or sulphur atoms or by imino groups. The radicals R at the same nitrogen atom may be attached directly to each other or through heteroatoms, in particular oxygen and sulphur, that is to say R' with R", R$_1$ with R$_2$, R$_3$ with R$_4$ and, in particular, R$_5$ with R$_6$. The radical Z$_4$ can therefore be, for example, a piperidine, pyrrolidine or morpholine radical. Z$_3$ is preferably a lower alkyl radical. Suitable examples of the radicals R', R", R$_1$, R$_3$, R$_4$, R$_5$, R$_6$ and Z$_3$ are methyl, ethyl, propyl, isopropyl, butyl, sec. butyl, n-pentyl, and octyl radicals, which can be interrupted by oxygen atoms and substituted by hydroxy, carboxyl, carbalkoxy (with 2 to 6 carbon atoms), alkoxy (with 1 to 18 carbon atoms), phenoxy, acyloxy (with 1 to 10 carbon atoms), phenyl groups which are unsubstituted or substituted by halogen atoms, lower alkyl or lower alkoxy, β-hydroxyethyl or lower carboalkoxy groups, or by benzyl groups or phenethyl or cyclohexyl groups, or together are attached to a piperidine, pyrriolidine, morpholine, piperazine or methylpiperazine ring.

Possible acyl radicals are, for example, fatty acid radicals with up to 5 carbon atoms, such as formyl, acetyl, propionyl, butyl radicals; alkylcarbamyl radicals with up to 5 carbon atoms, such as methylaminocarbonyl, ethylaminocarbonyl, propylaminocarbonyl, or butylaminocarbonyl radicals; alkyloxycarbonyl radicals with up to 5 carbon atoms, such as methoxycarbonyl, ethoxycarbonyl, propoxycarbonyl or butoxycarbonyl radicals; phenylcarbamoyl or phenoxycarbonyl radicals, benzoyl, phenoxyacetyl, chloroacetyl or phenylacetyl radicals.

Preferred dyestuffs are those of the indicated formula in which R$_1$, R$_2$, R$_3$ and R$_4$ represent hydrocarbon radicals with together at least 2, preferably 4, carbon atoms.

The radical W of an organic compound is the radical of any organic compound withich contains an active methylene (—CH$_2$—) group. The radical W is preferbly a group of the formula

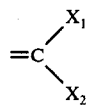

wherein X$_1$ represents a cyano, nitro, an acyl, aldehyde, a carboalkoxy, monocyclic aryl group, an optionally substituted carbonamido, alkylsulphonyl, monocyclic arylsulphonyl group, an optionally substituted sulphonamido group, and X$_2$ represents a cyano, an acyl, a carboalkoxy or an aldehyde group.

As examples of acyl radicals represented by X$_1$ or X$_2$ there may be cited acyl radicals which are derived from aliphatic carboxylic acids, in particular from lower aliphatic carboxylic acids, e.g. formic, propionic and butyric acid, or acyl radicals which are derived from monocyclic aromatic carboxylic acids, e.g. benzoic acid and toluic acid and substituted derivatives thereof, e.g. chlorobenzoic, methoxybenzoic or nitrobenzoic acid.

As example of carboalkoxy radicals represented by X$_1$ or X$_2$ there may be cited carbo (lower alkoxy) radicals, e.g. carbomethoxy, carboethoxy, and carbopropoxy radicals.

As examples of monocyclic aryl radicals represented by X$_1$, there may be cited phenyl and tolyl radicals and substituted derivatives thereof, e.g. chlorophenyl, methoxyphenyl and nitrophenyl.

As examples of substituted carbonamido radicals represented by X$_1$ there may be cited carbo-N-(lower alkyl) amido, carbo-N:N-di(lower alkyl)amido and carbo-N-(substituted or non-substituted phenyl)amino radicals, e.g. carbo-N-methylamido, carbo-N:N-dimethylamido, carbo-N-phenylamido, carbo-N-(tolyl-)amido, carbo-N-(chlorophenyl)-amido, carbo-N-(nitrophenyl)-amido and carbo-N-(methoxy-phenyl)amido radicals.

As examples of alkylsulphonyl radicals represented by X$_1$ there may be cited lower alkylsulphonyl radicals, e.g. methylsulphonyl, ethylsulphonyl and propylsulphonyl radicals.

As examples of monocyclic arylsulphonyl radicals represented by X$_1$ there may be cited benzenesulphonyl and toluenesulphonyl radicals and substituted derivatives thereof, e.g. chlorobenzenesulphonyl, methoxybenzenesulphonyl, and nitrobenzenesulphonyl radicals.

As examples of substituted sulphonamide groups represented by X$_1$ there may be cited N-(lower alkyl)-sulphonamide and N:N-di(lower alkyl)-sulphonamide groups, e.g. N-methylsulphonamide, N-ethylsulphonamide and N:N-dimethylsulphonamide groups.

Preferably, however, either X$_1$ or X$_2$ represents the cyano group, or above all, both X$_1$ and X$_2$ represent the cyano group. If reactants which do not contain any quaternary nitrogen atoms are used as starting materials, condensation of the aldehydes with the compounds which contain active methylene groups yields useful disperse dyestuffs which constitute a preferred embodiment of the invention. A further preferred embodiment of the invention comprises the dyestuffs of the formula.

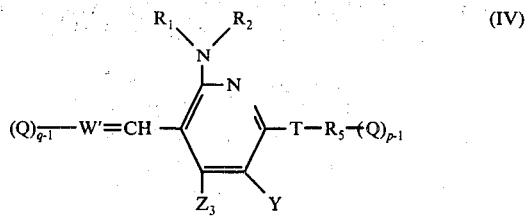

wherein W' represents the radical of an organic compound which contains an active methylene group, Z$_3$ is an unsubstituted or substituted hydrocarbon radical or, preferably, —NR$_3$R$_4$, and Y is a group of the formula —CN or CONH$_2$ and each of R$_1$, R$_2$, R$_3$ and R$_5$ represents hydrogen or an aryl, an aralkyl, a cycloalkyl or an aliphatic radical, and with R$_2$ and R$_3$ with R$_4$ are able to form a ring containing the amino nitrogen and Q represents an optionally quaternised amino, hydrazino or etherified hydroxylamino or pyridine group, which is bonded directly or through a bridge, and each of $p$ and $q$ is 1 or 2, and wherein T is an oxygen or sulphur atom or an imino group of the formula

wherein R$_6$ is hydrogen, aryl, aralkyl, cycloalkyl or an aliphatic radical which can be attached to R$_5$ or Q. The basic radical Q may be bonded directly to the active methylene component W'; but it can also be located at a substituent, e.g. at an alkyl or alkoxy group of the radical of the active methylene component, or attached to the dye molecule through an alkylenecarbonyl, carbonyloxy, carbonylamino, alkylenecarbonyloxy, alkylenecarbonylamino, alkylenesulphonylamino or alkylenesulphonyl bridge. The basic group Q can also form a ring together with R$_5$ and T is for example a piperazine radical.

The process according to the invention is advantageously carried out by stirring the reactants in an organic solvent, e.g. methanol, and in the presence of a base, e.g. ammonia, or a secondary amine, e.g. diethylamine or piperidine, or an alkali metal derivative of an alcohol, e.g. the sodium derivative of methanol or ethanol, with the reaction temperature being preferably between 20° C and the boiling point of the organic solvent. The resulting dyestuff is then isolated in known manner, e.g. by distilling off the organic solvent or by addition of a liquid, e.g. water, by which means the dyestuff is precipitated from the solution in the organic solvent. The reaction with 1-chloro-2,2-dicyanoethylene is carried out according to the process described in German Offenlegungsschrift 2 246 437 in the presence of acid acceptors, e.g. dimethylamine, triethylamine, pyridine etc., at temperatures of 40° to 180° C, preferrably from 60° to 150° C, in inert organic solvents (e.g. tetrahydrofuran, chlorobenzene).

As examples of compounds which contain a reactive methylene group and which are suitable for the process according to the invention, there may be cited acetyl acetone; ethylcyanoacetate, methylcyanoacetate, methylacetoacetate, ethylacetoacetate, ethylbenzoylacetate, ethyloxaloacetate, dimethylmalonate, di-n-propylmalonate, malonodinitrile, cyanoacetamide, ethyl-β-nitro-acetate, ω-cyanoacetophenone, acetoacetamide, acetoacet-N-methylamide, acetoacet-N-N-diethylamide, benzoylacetone, propionylacetone, ethylformlacetate, malonodialdehyde, phenyl-α-cyanomethylsulphone, acetoacetanilide, aceto-o-toludide, acetoacet-m-anisidide, methylphenylsulphonyl acetate and phenylsulphonyl acetamide.

The aldehydes of the formula I, which are used according to the invention, can themselves be manufactured by reacting a compound of the formula

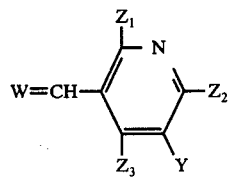

wherein $Z_1$, $Z_2$, $Z_3$ and Y have the meanings given hereinbefore, with phosphoroxy chloride in dimethyl formamide.

Preferably, W represents the group of the formula

Possible basic groups Q are, for example, those of the formula

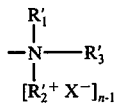

wherein $R_1'$ and $R_2'$ represent hydrogen or an alkyl radical (especially one with 1 to 4 carbon atoms), an aralkyl radical, in particular a benzyl or a cycloalkyl radical, especially cyclohexyl, $R_3'$ represents hydrogen or an alkyl, aralkyl, cycloalkyl or alkoxy radical or an amino group, and wherein the nitrogen atom with $R_1'$ and/or $R_2'$ and/or $R_3'$ is able to form part of a heterocyclic ring, X is an anion and n is 1 or 2. These radicals can derive, for example, from the amines, hydroxyplamines and hydrazines cited hereinbelow in connection with the manufacture of the dyes by condensation. The anions can be those of strong, inorganic acids, e.g. chloride, bromide, iodide, nitrate, sulphate, in particular hydrogen sulphate and phosphate, especially dihydrogen phosphate. Anions of organic acids are also possible, by which are meant aryl- and alkylsulphonates and -carboxylates, in particular benzenesulphonate and its derivatives substituted by nitro, chlorine, bromine, alkyl and alkoxy groups, each with 1 to 4 carbon atoms, alkylsulphonates with 1 to 4 carbon atoms, anions of aliphatic carboxylic acids with 1 to 4 carbon atoms and benzoates, it being possible for the benzene ring to carry the same substituents as in the case of the benzenesulphonates. Of particular impartance are the anions of low molecular alkylsulphuric acid half esters, i.e. those which contain 1 to 4 carbon atoms. Furthermore, the dyes can be in the form of double salts with heavy metal halides, in particular with zinc and cadmium halides.

Examples of such anions are: benzenesulphonate, p-toluenesulphonate, p-methoxybenzenesulphonate, methanesulphonate, ethanesulphonate, formiate, acetate, chloroacetate, propionate, lactate, tartrate, benzoate, methyl benzoate, methylbenzoate, methyl sulphate, ethyl sulphate, $ZnCl_3$, $CdCl_3$, carbonate and bicarbonate.

Preferred basic radicals are those of the given formula, in which $R_1'$, $R_2'$ and $R_3'$ are low molecular radicals, in particular methyl radicals.

The basic groups can also be pyridine radicals of the formula

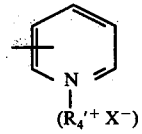

in which $R_4'$ represents an alkyl radical, especially one with 1 to 4 carbon atoms, a cycloalkyl, in particular cyclohexyl, radical, or an aralkyl, in particular benzyl, radical, and X and n have the same meanings as hereinbefore.

As examples of amines there may be cited; naphthylamine, aniline and derivatives thereof, e.g. 1-amino3-chlorobenzene, 1-amino-4-carboethoxybenzene, 1-amino-2,4-dicyanobenzene, 1-amino-2-methoxy-4-nitrobenzene, 1-amino-2-methanesulphonyl-4-chlorobenzene, methylaminobenzene, ethylaminobenzene, 1-methylamine-3-chlorobenzene; primary and secondary amines, e.g. methylamine, ethylamine, isopropylamine, hexylamine, octylamine, decylamine, methoxyethylamine, isopropoxypropylamine, dimethylamine, diethylamine, chloroethylamine, ethanolamine, diethanolamine, propanolamine, benzylamine or cyclohexylamine, morpholine, pyrrolidine, and piperidine.

As examples of alcohols there may be cited: ethanol, propanol, isopropanol, butanol, 2-ethoxyethanol, cyclohexanol, benzyl alcohol, phenyl and substituted derivatives thereof.

Examples of mercapto compounds are: ethyl mercaptan, thiophenol.

Preferred pyridine components are those 3-caebonamido- or 3-cyano-4,6-diaminopyridines which in 2-position carry an amino group, in particular a morpholino, pyrrolidino or piperidino group.

It is possible to convert the 3-cyano group into the 3-CONH$_2$ group by saponification in concentrated sulphuric acid.

Instead of a homogeneous pyridine component, it is also possible to use a mixture of two or more of the pyridine compounds according to the invention of the formula V.

Those new dyes which contain a quaternised nitrogen atom can also be obtained by quaternising the corresponding dyes which contain a non-quaternised amino, hydrazino or etherified hydroxylamino group or nitrogen-containing heterocyclic group, by treatment with alkylating agents. Examples of such alkylating and quaternising agents which can be used are: esters of strong mineral acids, in particular low molecular sulphuric acid esters, or esters of organic sulphonic acids, for example dimethyl sulphate, diethyl sulphate, alkyl halides, e.g. methyl chloride, bromide or iodide, aralkyl halides, e.g. benzyl chloride, esters of low molecular alkanesulphonic acids (i.e. with 1 to 4 carbon atoms), e.g. methyl esters of methane, ethers or butanesulphonic acid, and esters of benzenesulphonic acids, which can contain additional substituents, e.g. methyl, ethyl, propyl or butyl esters of benzenesulphonic acid, of 2- or 4-methylbenzenesulphonic acid, 4-chlorobenzenesulphonic acid or 3- or 4-nitrobenzenesulphonic acid.

The alkylation advantageously takes place by warming in an inert organic solvent, for example hydrocarbons, for example benzene, toluene or xylene, halogenated hydrocarbons for example carbon tetrachloride, tetrachlorethane, chlorobenzene or o-dichlorobenzene, or nitro-hydrocarbons for example nitromethane, nitrobenzene or nitrophthalene. Acid anhydrides, acid amides or nitriles, for example acetic anhydride, dimethylformamide or acetonitrile, or also dimethylsulphoxide, can also be employed as solvents in the alkylation. Instead of a solvent, a large surplus of alkylating agent can also be used. In this case it is essential to ensure that the mixture does not become overheated since the reaction is strongly exothermic. Nevertheless it is necessary in most cases, especially in the presence of organic solvents, to heat the reaction mixture externally in order to initiate the reaction. In special cases the alkylation can also be effected in an aqueous or alcoholic medium, if desired in the presence of small amounts of potassium iodide.

If necessary, the dye salts are purified appropriately by dissolving them in water, in the process of which any unreacted starting dye can be filtered off as insoluble residue. The dye can be reprecipitated from the aqueous solution by addition of water-soluble salts, for example sodium chloride.

The resulting dye salts can contain the anions introduced according to the invention. But these can also be subsequently replaced by anions of other inorganic or organic acids.

It is also possible to obtain the quaternised dyestuffs by condensation.

In the manufacture by condensation, a dye of the formula

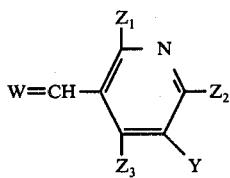

wherein W, $Z_1$, $Z_2$, $Z_3$ and Y have the meaninge given hereinbefore, but wherein at least one radical Z and/or D contains instead of a basic group a reactive atom or a reactive radical, which latter is able to react with an amine, hydrazine, etherified hydroxylamine or a carboxylic halide, or a dye of the formula

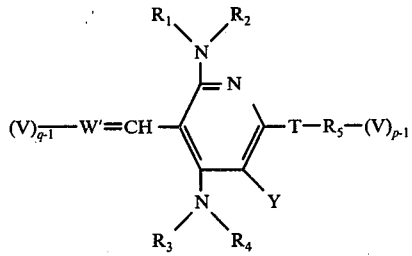

wherein W', $R_1$, $R_2$, $R_3$, $R_4$, $R_5$, Y, T, $p$ and $q$ have the meanings given, but $p + q$ must be at least 3 and V represents a reactive atom or a reactive group, is reacted with an amine, hydrazine, etherified hydroxylamine, a pyridinecarboxylic acid chloride or an optionally quaternary aminocarboxylic acid chloride.

Suitable reactive atoms and groups are: halogen atoms, in particular chlorine or bromine, benzenesulphonic acid ester groups, such as p-toluenesulphonates and benzenesulphonates, low molecular alkylsulphonic acid ester and alkylsulphuric acid half ester groups (i.e. containing from 1 to 4 carbon atoms), such as methyl sulphate and methane sulphonate, hydroxyl and amino groups.

Preferably tertiary amines, hydrazines or hydroxylamines are used for the condensation, since cationic dyes with quaternary nitrogens are directly obtained in this way. The anion of these dyes - provided it is not subsequently exchanged — corresponds to one of the reactive radicals V. The dyes used in the manufacture by condensation are advantageously manufactures by coupling. For this purpose, a start is made from compounds which correspond to the components used in the coupling process; but instead of the basic groups they contain the cited removable atoms or groups.

The dyes manufactured from these components by coupling are reacted according to the invention with pyridine carboxylic acid chlorides, or, optionally, quaternary aminocarboxylic acid chlorides, amines, hydrazines or etherified hydroxylamines.

The following for example may be mentioned as such compounds:

Amines: primary and secondary amines for example methylamine, ethylamine, isopropylamine, methoxyethylamine, methoxypropylamine, dimethylamine, diethylamine, ethylphenylamine, diethanolamine, propanolamine, benzylamine, cyclohexylamine, morpholino, pyrrolidine, piperidine, piperazine, tertiary amines for example trimethylamine, triethylamine, dimethylaniline, triethanolamine, pyridine, picoline, lutidine, N-methylpiperidine, N-methyl-piperazine, N-methylmorpholine, quinoline or pyrimidine.

Hydrazines: N-methylhydrazine, N,N-dimethylhydrazine, N,N'-diethylhydrazine, N,N,N'-trimethylhydrazine, N,N,N,N'-tetramethylhydrazine, N-aminopiperidine, N-aminopyrrolidine and 1,5-diazabicyclo-(0,3,3)-octane.

Etherified hydroxylamines:

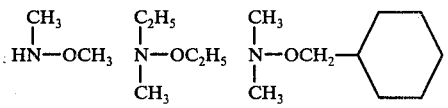

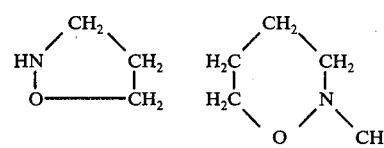

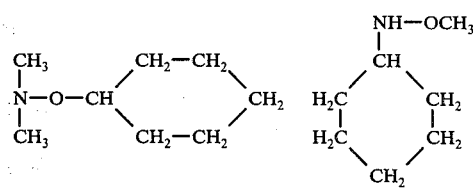

Etherified hydroxylamines:

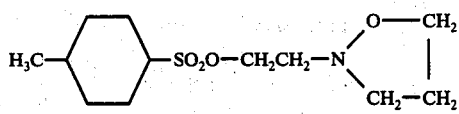

Carboxylic chlorides:

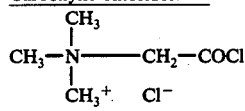

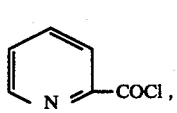 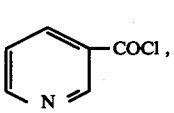 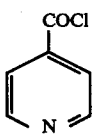

The reaction of the dyestuff which for example contains a halogen or a sulphatoalkyl group with the amine, hydrazine or etherified hydroxylamine can be carried out in a neutral solvent, for example in chlorobenzene, alcohols or aqueous alcohol mixtures or dimethylformamide, or also without solvents, advantageously at an elevated temperature in an excess of the hydroxylamine with or without the addition of catalysts, for example NaI.

The acylation of dyes containing an acylatable hydroxyl or amino group with the cited carboxylic chlorides is preferably carried out in the presence of acid acceptors, such as alkali acetates and alkaline earth acetates, hydrogen carbonates or carbonates or pyridine, in an organic or organic-aqueous medium, by methods which are known per se.

The new compounds, their mixtures with one another and their mixtures with other azo dyestuffs are highly suitable for dyeing and printing leather, wool, silk and above all, synthetic fibres, for example acrylic or acrylonitrile fibres, polyacrylonitrile fibres and co-polymers of acrylonitrile and other vinyl compounds, such as acrylic esters, acrylic amides, vinyl pyridine, vinyl chloride or vinylidene chloride, co-polymers of dicyanoethylene and vinyl acetate, and acrylonitrile block copolymers, fibres of polyurethane, polyolefines, such as basically modified polypropylene, polyporpylene modified with nickel or unmodified polypropylene, cellulose triacetate and cellulose 2 ½-acetate, and especially fibres of polyamides, such as nylon-6, nylon-6,6 or nylon-12, and of aromatic polyesters, such as those from terephthalic acid and ethylene glycol or 1,4-dimethylcyclohexane and co-polymers of terephthalic acid and isoterephthalic acid with ethylene glycol.

The dyeing of the above mentioned fibre materials with the azo dyestuffs according to the invention that are sparingly soluble in water, is carried out preferably from aqueous dispersions. If the dyestuffs of the invention contain hydrophilic groups, e.g. one or more hydroxyalkyl, carboxylic amide or sulphonamide groups in the diazo component, they are best applied from a solvent liquor. It is appropriate, therefore, to finely divide the representatives suitable for use as disperse dyestuffs by grinding them with textile assistants, for example dispersants and possibly with other grinding assistants. By subsequent drying, dyestuff preparations are obtained consisting of textile assistant and the dyestuff.

Examples of dispersants of the non-ionic groups that can be used with advantage are: addition products of 8 mols of ethylene oxide with 1 mol of p-tert.-octylphenol, of 15 resp. 6 mols of ethylene oxide with castor oil, of 20 mols of ethylene oxide with the alcohol $C_{16}H_{33}OH$, ethylene oxide addition products with di-[α-phenylethyl]-phenols, polyethylene oxide-tert.-dodecyl-thioether, polyamine-polyglycol ether or addition products of 15 or 30 mols of ethylene oxide with 1 mol of the amine $C_{12}H_{25}NH_2$ or $C_{18}H_{37}NH_2$.

As anionic dispersants there may be mentioned: sulphuric acid esters of alcohols of the fatty series having 8 to 20 carbon atoms, of the ethyleneoxy adducts of the corresponding fatty acid amides, or of a alkylated phenols having 8 to 12 carbon atoms in the alkyl radical; sulphonic acid esters with alkyl radicals having 8 to 20 carbon atoms; sulphation products of unsaturated fats and oils; phosphoric acid esters having 8 to 20 carbon atoms; fatty acid soaps also alkylaryl sulphonates, condensation products of formaldehyde with naphthalenesulphonic acid and lignin sulphonate.

Suitable cationic dispersants are quaternary ammonium compounds that contain alkyl or aralkyl radicals having 8 to 20 carbon atoms.

In addition to the dispersants, the dyestuff preparations can contain organic solvents, especially solvents that boil above 100° C and preferably are miscible with water, such as mono- and dialkylglycol ether, dioxane, dimethylformamide or dimethylacetamide, tetramethylenesulphone or dimethylsulphoxide. Dyestuff, dispersant and solvent can with advantage be ground with one another.

The polyester fibres are dyed from aqueous dispersion with the dyestuffs according to the invention, which are sparingly soluble in water, according to the conventional processes for polyester materials. Polyesters of aromatic polycarboxylic acids with polyhydric alchols are dyed preferably at temperatures of over 100° C under pressure. However, the dyeing can also be carried out at the boiling point of the dye bath in the presence of dyestuff carriers, for example phenylphenols, polychlorobenzene compounds or similar auxiliaries, or according to the thermosol process, that is to say padding with subsequent after-treatment with the application of heat, for example thermosetting, at 180°-210° C. Cellulose 2½-acetate fibres are dyed preferably at temperatures of 80°-85° C, whereas cellulose triacetate fibres are dyed advantageously at the boiling point of the dye bath. The use of dyestuff carriers is superfluous in dyeing cellulose 2½-acetate or polyamide fibres. Anthraquinone dyestuffs according to the invention can also be used for printing the cited materials according to conventional methods.

The dyeings obtained according to the instant process can be subjected to an after-treatment, for example by heating with an aqueous solution of an ion-free detergent.

According to the process of the present invention, the cited compounds can also be applied by printing instead of by impregnating. To this end, a printing ink, for example, is used which contains the finely dispersed dyestuff in addition to the usual assistants used in the printing industra, such as wetting agents and binders.

Furthermore, it is possible to dye, for example, synthetic fibres, such as polyesters and polyamides in organic solvent liquors, such as a mixture of perchlorethylene and dimethylformamide or in pure perchloroethylene.

According to the process of the present invention, full dyeings and prints possessing good fastness properties are obtained, especially good fastness to thermosetting, sublimation, pleating, exhaust gas, cross-dyeing, dry-cleaning, ironing, rubbing, chlorine, and good wet fastness properties, for example fastness to water, washing and perspiration.

It is also possible to use the new water-insoluble compounds for the spin dyeing of polyamides, polyesters and polyolefins. The polymers to be dyed are appropriately in the form of powder, grains or ships, as ready prepared spinning solution or mixed in the fused state with the dyestuff, which is introduced in the dry state or in the form of a dispersion or solution in an optionally volatile solvent. After the dyestuff has been uniformly distributed in the solution or the melt of the polymer, the mixture is processed in known manner by pouring, moulding or extruding to fibres, yarns, monofilaments, films and the like.

The dyestuffs or dyestuff salts obtained in accordance with the invention which may contain a quaternised amino, hydrazino or etherified hydroxylamino group are suitable for dyeing and printing a wide variety of man-made synthetic fibres, for example polyvinyl chloride, polyamide or polyurethane fibres, and also fibres of polyesters of aromatic dicarboxylic acids, for example polyethylene terephthalate fibres, but expecially polyacrylonitrile fibre materials or polyvinylidene cyanide fibres (Darvan). The term "polyacrylonitrile fibres" is to be understood as including all polymers which contain more than 80%, for example 80 to 95%, of acrylonitrile together with 5 to 20% of vinyl acetate, vinylpyridine, vinyl chloride, vinylidene chloride, acrylic acid, acrylic acid esters, methacrylic acid, methacrylic acid esters and the like. The products are for example sold under the following trade names: "Acrilan 1656" (The Chemstrand Corporation, Decatur, Alabama, U.S.A.), "Acrilan 41" (The Chemstrand Corporation), "Creslan" (American Cyanamid Company), "Orlon 44" (DuPont), "Crylor Hill" (Soc. Rhodiaceta SA, France), "Leacril N" (Applicazioni Chimice Societa per Azioni, Italy), "Dynel" (Union Carbide Chem. Corp.), "Exlan" (Japan Exlan Industry Co., Japan), "Vonnel" (Mitsubishi, Japan), "Verel" (Tennessee Eastman, U.S.A.), "Zefran" (Dow Chemical, U.S.A.), "Wolcrylon" (Filmfabrik Agfa, Wolfen), "Ssaniw" (U.S.S.R.) and also "Orlon 42", "Dralon", "Courtelle" and the like.

On these fibres, which can also be dyed in admixture, the new dyestuffs yield intense and level dyeings of good light fastness and good general fastness properties, especially good fastness to washing, perspiration, sublimation, creasing, decatising, ironing, rubbing, carbonisation, water, chlorine water, seawater, dry cleaning, crossdyeing and solvents. The new dyestuffs according to the invention also possess interalia a good stability over a wide pH range, good affinity and good building-up capacity, for example in aqueous solutions of different pH-values, and good fastness to bucking. Furthermore the new dyestuffs generally reserve well on wool and other natural polyamide fibres, as well as on cotton. The dyeings are also distinguished by luminous shades.

The quaternised water-soluble dyestuffs are generally of low sensitivity to electrolytes and in part show an exceptionally good solubility in water or polar solvents. Dyeing with the quaternised water-soluble dyestuffs is in general carried out in an aqueous neutral or acid medium, at boiling temperature under atmospheric pressure or in a closed vessel at elevated temperature and pressure.

They can also be applied to the fibrous materials by printing. For this purpose for example, a printing paste is used which contains the dyestuff together with the assistants customary in printing. They are furthermore suitable for the dope dyeing of polymerisation products of acrylonitrile and other plastic compositions which may be dissolved, to give shades fast to light and washing, and also for colouring oil paints or lacquers, or finally also for colouring paper and for dyeing mordanted cotton.

In the following Examples which illustrate the invention the parts and percentages are by weight, unless otherwise stated.

EXAMPLE 1

(A) A mixture of 18.7 parts of 3-cyano-2,6-dichloro-4-methylpyridine (Bobbit et al., I Org. Chem., Vol. 25, p. 560 [1960]), 20 parts of dimethylamine and 180 parts of alcohol were heated in an autoclave for 12 hours to 120°–130° C. After the mixture had cooled, the solvent was completely removed in vacuo to leave as residue the bisdimethylamine compound of the formula

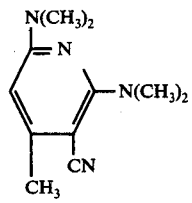

as a straw yellow ctystalline substance which was freed from dimethylamine hydrochloride by washing with water. The melting point of the pure compound was 70°–71° C.

(B) 20.4 parts of the above bis-dimethylamine compound were added at 10°–20° C to a mixture of 43 parts of phosphoroxy chloride and 60 parts of dimethyl formamide. The mixture was heated for 5 hours to 55°–60° C. After it had cooled to room temperature, the mixture was added to 500 parts of water and neutralised with sodium carbonate. The aldehyde of the formula

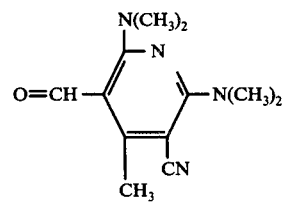

then separated out as a slightly yellow precipitate, which was filtered off, washed and dried. Melting point: 127°–132° C. The product was used for the next step without further purification.

(C) A mixture of 23.2 parts of the above aldehyde, 7 parts of malonic dinitrile, 100 parts of methanol, and 0.5 part of piperidine is refluxed for 3 hours. After the mixture has cooled, the dyestuff of the formula

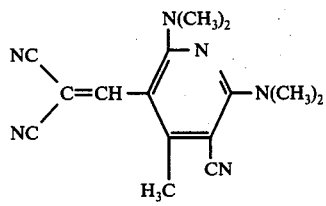

crystallises out. It dyes polyester fibres in pure yellow shades with good fastness to light and sublimation.

EXAMPLE 2

(A) A mixture of 18.7 parts of 3-cyano-2,6-dichloro-4-methylpyridine, 10 parts of dimethylamine and 190 parts of alcohol is refluxed for 10 minutes. After the mixture has cooled, the compound of the formula

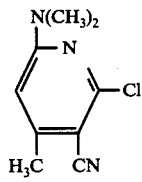

precipitates in thin, colourless needles (m.p. 194°–196° C).

(B) A mixture of 19 parts of the above monochloro compound, 15 parts of isopropylamine and 100 parts of alcohol is heated in an autoclave for 12 hours to 130°–140° C. After the mixture has cooled, the compound of the formula

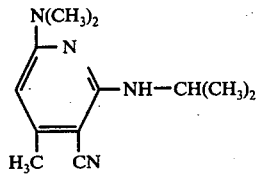

precipitates in staw-colored needles (m.p. 133°–135° C).

(C) 21.8 parts of the diamino compound are added at 10° to 20° C to a mixture of 43 parts of phosphoroxy chloride and 60 parts of dimethyl formamide. The mixture is heated for 5 hours to 55°–60° C, drowned into 500 parts of water and brought to a pH of 8 to 9 with 10% sodium hydroxide solution. The aldehyde of the formula

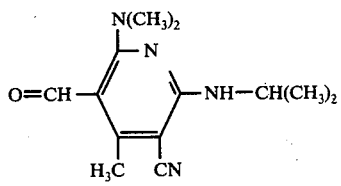

precipitated after 15 hours at 10° to 15° C.

(D) Reaction with malonic acid dinitrile (as in Example 1C) yielded the dyestuff of the formula

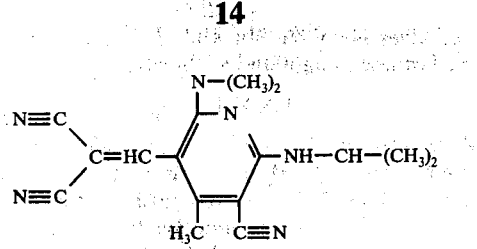

which dyes polyester fibres in bright, yellow shades of good fastness to light and sublimation.

EXAMPLE 3

The dimethylamino-monochloro derivative described in Example 2(A) is reacted with N-ethylaminoethanol to give the compound of the formula

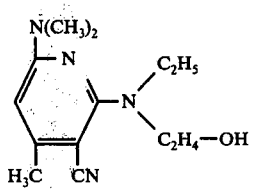

which is reacted at the free hydroxy group with benzoyl chloride/triethylamine to give the benzoic acid ester. As described in Example 1(B), this ester is reacted according to the method of Vilsmeyer to give the aldehyde, which is condensed as described in Example 1(C) to give the dyestuff of the formula

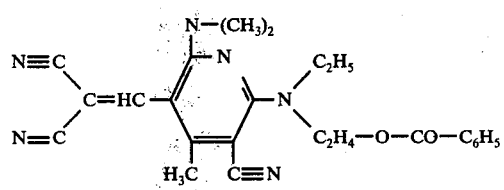

which dyes polyester fibres in brilliant, greenish yellow shades of good fastness to light and sublimation.

EXAMPLE 4

(A) The 6-dimethylamino derivative is obtained as colourless needles by heating 6-chloro-3-cyano-2,4-bis-(dimethylamino)-pyridine (Cossey et al. Angew. Chemie, vol. 84, p. 1183 [1972]) with dimethylamine and ethanol in an autoclave.

(B) A mixture of 23.3 parts of the tris-dimethylamino derivative, 6 parts of 1-chloro-2,2-dicyanoethylene and 150 parts of tetrahydrofuran are refluxed for 1 hour. After the mixture has cooled, the precipitated hydrochloride of the tris-compound is filtered off and the solvent is evaporated off. The deep, yellowish brown oily residue is triturated with methanol and yields the crystalline dyestuff of the formula

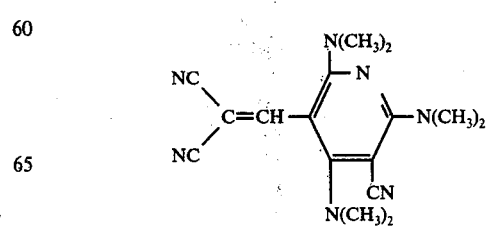

which dyes polyester fibres in clear yellow shades of good fastness to light and sublimation.

EXAMPLE 5

A mixture of 22.5 parts of 6-chloro-3-cyano-2,4-bis-(dimethylamino)-pyridine, 6 parts of sodium methyl alcoholate (NaOCH$_3$) and 100 parts of methanol is refluxed for 12 hours in an autoclave to 130°–140° C. The mixture is subsequently cooled and the precipitate that has formed filtered off. Recrystallisation of the precipitate from hexane yields the compound of the formula

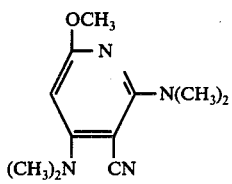

(m.p. 86°–87° C).

Reaction with 1-chloro-2,2-dicyanoethylene (as in Example 4) yields the dyestuff of the formula

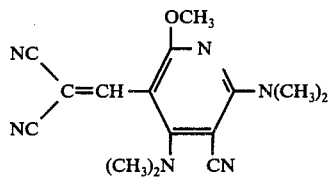

which dyes polyester fibres in neutral yellow shades of good fastness properties.

EXAMPLE 6

(A) A mixture of 15 parts of 3-cyano-2,6-dihydroxy-4-phenylpyridine and 70 parts of phosphoroxy chloride is heated in a glass lined autoclave for 6 hours to 150°–160° C. The mixture is cooled and then drowned into water, to yield the compound of the formula

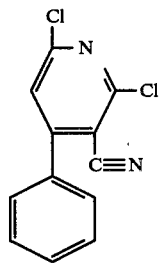

(m.p. 172°–174° C).

(B) Reaction with 40% NH(CH$_3$)$_2$/ethanol at 130° to 140° C yields the compound of the formula

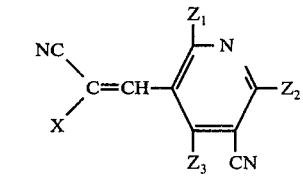

(faintly yellow crystals; m.p. 149°–151° C).

(C) The condensation with 1-chloro-2,2-dicyanoethylene in tetrahydrofuran (1 hour under reflux) yields the dyestuff of the formula

which dyes polyester fibres in greenish yellow shades of good fastness to light and sublimation. The dyestuffs of the formula

which are listed in the following Table are obtained in analogous manner. The cyanoethylene group was introduced by condensation according to Vilsmeyer with malanic acid dinitrile, cyanoacetic esters or phenylcyanomethylsulphone.

| | X | $Z_1$ | $Z_2$ | $Z_3$ |
|---|---|---|---|---|
| 1 | CN | N(C$_2$H$_5$)$_2$ | N(C$_2$H$_5$)$_2$ | CH$_3$ |
| 2 | CN | N(CH$_3$)$_2$ | NHCH$_2$CH(CH$_3$)$_2$ | C$_6$H$_5$ |
| 3 | COOCH$_3$ | N(CH$_3$)$_2$ | N(CH$_3$)$_2$ | CH$_3$ |
| 4 | CN | N(CH$_3$)$_2$ | N(C$_2$H$_5$)(C$_2$H$_4$OCOCH$_3$) | CH$_3$ |
| 5 | CN | OC$_2$H$_5$ | N(CH$_3$)$_2$ | N(CH$_3$)$_2$ |
| 6 | COOC$_2$H$_5$ | N(CH$_3$)$_2$ | N(CH$_3$)$_2$ | C$_6$H$_5$ |
| 7 | CN | N(CH$_3$)$_2$ | N(C$_2$H$_5$)(C$_2$H$_4$OCONHPh) | CH$_3$ |
| 8 | COOCH$_3$ | N(CH$_3$)$_2$ | NHCH(CH$_3$)$_2$ | CH$_3$ |
| 9 | CN | SCH$_3$ | N(CH$_3$)$_2$ | N(CH$_3$)$_2$ |
| 10 | CN | OC$_2$H$_5$ | N  O (morpholino) | N  O (morpholino) |
| 11 | CN | N(C$_2$H$_5$)$_2$ | NHCH$_2$C$_6$H$_5$ | CH$_3$ |

-continued

| X | $Z_1$ | $Z_2$ | $Z_3$ |
|---|---|---|---|
| 12 CN | ⟨N-morpholino⟩ | ⟨N-morpholino⟩ | $CH_3$ |
| 13 CN | $N(CH_3)_2$ | ⟨N-piperidinyl-H⟩ | $CH_3$ |
| 14 CN | $N(CH_3)_2$ | $N(C_2H_4OCOCH_3)_2$ | $CH_3$ |
| 15 CN | $N(CH_3)_2$ | $N(C_2H_4CN)_2$ | $CH_3$ |
| 16 CN | $N(CH_3)_2$ | $N(C_2H_4OCH_3)_2$ | $CH_3$ |
| 17 $COOC_4H_9$ | $N(C_2H_5)_2$ | $N(C_2H_5)_2$ | Ph |
| 18 CN | $N(CH_3)_2$ | $N(C_2H_5)(C_2H_4COOPh)$ | $CH_3$ |
| 19 CN | $N(CH_3)_2$ | $NHC_3H_6OCH(CH_3)_2$ | $C_4H_9$ |
| 20 $C_6H_5-SO_2$ | $N(C_2H_5)_2$ | ⟨N-piperidinyl-H⟩ | $C_2H_5$ |
| 21 CN | $N(CH_3)_2$ | $NHC_6H_5$ | $CH_3$ |
| 22 CN | $N(CH_3)_2$ | $NHC_6H_4CH_3(p)$ | $CH_3$ |
| 23 CN | $N(CH_3)_2$ | $NHC_6H_4OCH_3(p)$ | $CH_3$ |
| 24 $COOC_2H_5$ | $N(C_2H_5)_2$ | $NHC_6H_4Cl(p)$ | $C_4H_9$ |
| 25 $COOC_2H_5$ | $N(CH_3)_2$ | NH-cyclohexyl | $C_2H_5$ |
| 26 $C_6H_5-SO_2$ | $NHC_6H_5$ | $NHC_6H_{13}$ | $CH_3$ |
| 27 CN | $NHC_6H_4CH_3(p)$ | $N(CH_3)_2$ | $N(CH_3)_2$ |

EXAMPLE 7

(1) A mixture of 19.5 parts of 2-chloro-3-cyano-6-dimethylamino-4-methyl pyridine, 20 parts of N-methyl-piperazine and 200 parts alcohol is heated at 130°-40° for 12 hrs. in an autoclave. After the reaction mixture has been cooled, the solvent is removed completely by evaporation under reduced pressure. The residue is treated with water when the product:

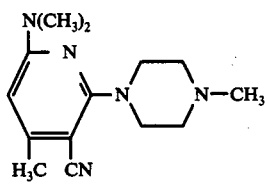

is obtained as colourless, crystalline precipitate. It is filtered and dried at room-tem. It crystallizes from cyclohexane in colourless prisms, m.p. 93°-94° C.

(2) 25.9 parts of the above product are added to a mixture of 25.0 parts of phosphorusoxychloride and 60 parts of dimethylformamide at 15°-20°. The mixture is heated to 55°-60° for 5 hours. After it has cooled to room temperature, the mixture is drowned into 500 parts of water and neutralized with sodium acetate or sodium bicarbonate when the aldehyde of the formula:

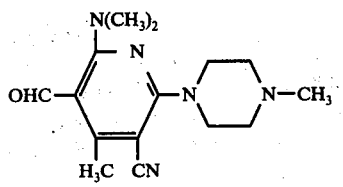

separates out as a colourless precipitate.

(3) A mixture of 28.7 parts of the above aldehyde, 7 parts of malodinitrile, 100 parts of methanol and 0.5 part of piperidine is refluxed for 1 hour. After the mixture has cooled, the dyestuff of the formula

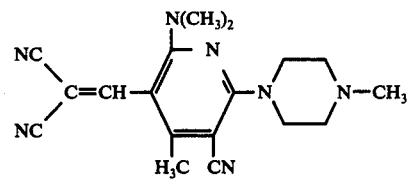

separates as yellow plates, (4) A mixture of 33.5 parts of the above styryl dye, 15.0 parts of methyl iodide and 250 parts of methanol is refluxed for 1 hour. After the batch has cooled a heavy yellow crystalline precipitate separates out. The product constitutes the dyestuff of the formula

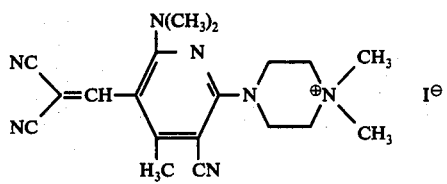

which dyes polyacrylic fibre from an aqueous solution a deep yellow shade of excellent fastness.

| | X | $Z_1$ | $Z_2$ | $Z_3$ | Quaternizing Agent |
|---|---|---|---|---|---|
| 1 | CN | ⟨N-piperazinyl-N-CH₃⟩ | $N(CH_3)_2$ | $N(CH_3)_2$ | $(CH_3)_2SO_4$ |

-continued

| | X | $Z_1$ | $Z_2$ | $Z_3$ | Quaternizing Agent |
|---|---|---|---|---|---|
| 2 | CN | $N(C_2H_5)_2$ | $NHC_3H_6N(CH_3)_2$ | $CH_3$ | $C_2H_5I$ |
| 3 | $COOCH_3$ |  (morpholine) | 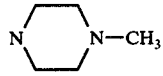 (N-methylpiperazine) | $C_6H_5$ | $(CH_3)_2SO_4$ |
| 4 | CN | $NHCH(CH_3)_2$ | 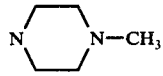 (N-methylpiperazine) | $C_6H_5$ | $(CH_3)_2SO_4$ |
| 5 | CN |  (piperidine NH) | $NHC_2H_4N(CH_3)_2$ | $CH_3$ | $(CH_3)_2SO_4$ |
| 6 | $COOC_2H_5$ | 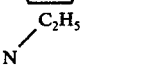 $N(C_2H_5)(C_2H_4OCOCH_3)$ | 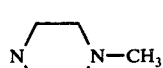 (N-methylpiperazine) | $C_6H_5$ | $(C_2H_5)_2SO_4$ |
| 7 | CN | $NHC_2H_4N(CH_3)_2$ | 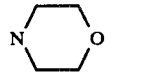 (morpholine) | 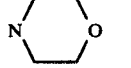 (morpholine) | $C_6H_5SO_3CH_3$ |
| 8 | CN | 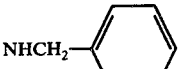 ($NHCH_2$-pyridyl) | $N(C_2H_5)_2$ | $N(C_2H_5)_2$ | $C_6H_5CH_2Cl$ |
| 9 | $COOC_4H_9$ | $N(C_3H_7)_2$ | 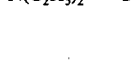 $N(C_2H_5)(C_2H_4OCO$-pyridyl$)$ | $C_4H_9$ | $C_7H_7SO_3CH_3$ |
| 10 | $COOC_2H_5$ | $N(CH_3)_2$ | 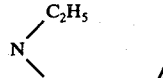 ($NHCH_2CH_2$-pyridyl) | $CH_3$ | $(CH_3)_2SO_4$ |
| 11 | CN | $NHC_6H_4CH_3(p)$ | 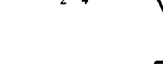 $N(C_2H_5)(C_2H_4Cl)$ | $CH_3$ | 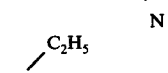 (pyridine) |
| 12 | CN | $N(C_2H_5)_2$ |  $N(C_2H_5)(C_2H_4Cl)$ | $CH_3$ | $N(CH_3)_3$ |
| 13 | CN | $N(CH_3)_2$ |  $N(C_2H_5)(C_2H_4Cl)$ | $CH_3$ | $H_2NN(CH_3)_2$ |
| 14 | $C_6H_5SO_2$ | $NHC_6H_4CH_2N(CH_3)_2$ |  (piperidine NH) | $CH_3$ | $(CH_3)_2SO_4$ |

DYEING PROCEDURE FOR ACRYLIC FIBERS 1 part of the above dyestuff is dissolved in 5000 parts water containing 2 parts of 40% acetic acid.

100 parts of dry yarn made from polyacrylonitrile staple fibers were introduced at 60°. The temperature was then raised at 100° within one hour and the bath was kept boiling for one hour. The dyed yarn was then thoroughly rinsed and dried. A deep yellow shade was obtained.

DYEING INSTRUCTION FOR POLYESTER FIBERS 1 part of the dyestuff obtained according to Example 1 is ground with 2 parts of a 50% aqueous solution of the sodium salt of dinaphthylmethane disulphonic acid, and dried.

This dyestuff preparation is stirred with 40 parts of a 10% aqueous solution of the sodium salt of N-benzyl-µ-heptadecylbenzimidazole disulphonic acid and 4 parts of a 40% acetic acid solution are added. 4000 parts of a dyeing bath are prepared therefrom by dilution with water.

100 parts of a cleaned polyester fibre material are introduced into this bath at 50° C, the temperature is raised to 120° to 130° C during half an hour, and dyeing is carried out for 1 hour in a closed vessel at this temperature. Thereafter the material is well rinsed.

A deep yellow shade was obtained.

We claim:

1. A styryl dye devoid of acid, water-solubilizing groups, of the formula

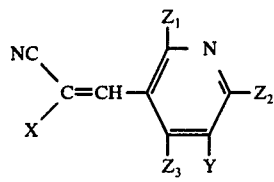

wherein two radicals Z are —NR'R" and one Z is —NR'R", —OR''' or SR''' in which R', R" and R''' are hydrogen, phenyl phenyl substituted by chlorine, bromine, lower alkyl of 1 to 5 carbon atoms, lower alkoxy of 1 to 2 carbon atoms, hydroxyethyl or carbolower alkoxy of 1 to 5 carbon atoms, benzyl, phenethyl, cyclohexyl, $C_1$–$C_8$-alkyl, $C_1$–$C_8$-alkyl interrupted by an oxygen atom, or $C_1$–$C_8$-alkyl substituted by hydroxy, carboxyl, carbo-$C_1$–$C_5$-alkoxy, alkoxy, phenoxy, $C_1$–$C_{18}$-fatty acid acyloxy, benzoyloxy, $C_1$–$C_{18}$-alkylcarbamoyloxy, $C_1$–$C_{18}$-alkyloxycarbonyloxy, phenylcarbamoyloxy, phenyloxycarbonyloxy, phenoxyacetoxy, chloroacetoxy, or phenylacetoxy, $Z_3$ is also lower alkyl of 1 to 5 carbon atoms or phenyl, Y is -CN and X is NC-.

2. A styryl dyestuff according to claim 1, of the formula

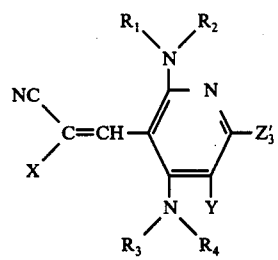

wherein $R_1$, $R_2$, $R_3$, $R_4$ each are hydrogen, phenyl, phenyl substituted by chlorine, bromine, lower alkyl of 1 to 5 carbon atoms, lower alkoxy of 1 to 2 carbon atoms, hydroxyethyl or carbo-lower alkoxy of 1 to 5 carbon atoms, benzyl, phenethyl, cyclohexyl, $C_1$–$C_8$-alkyl, $C_1$–$C_8$-alkyl interrupted by an oxygen atom, or $C_1$–$C_8$-alkyl substituted by hydroxy, carbonyl, carbo-$C_1$–$C_5$-alkoxy, alkoxy, phenoxy, $C_1$–$C_{18}$-fatty acid acyloxy, benzoyloxy, $C_1$–$C_{18}$-alkylcarbamoyloxy, $C_1$–$C_{18}$-alkyloxycarbonyloxy, phenylcarbanoyloxy, phenyloxycarbonylosy, phenoxyacetoxy, chloroacetoxy or phenylacetoxy, and Z', X and Y have the same meanings as in claim 1.

3. A styryl dyestuff according to claim 1, wherein X is cyano.

4. A styryl dyestuff according to claim 1, wherein $Z_2$ is methyl.

5. A styryl dyestuff according to claim 2, wherein $R_1$, $R_2$, $R_3$ and $R_4$ are hydrogen or alkyl, the alkyl groups containing together at least 2 carbon atoms.

6. A styryl dyestuff according to claim 2, wherein $R_1$, $R_2$, $R_3$ and $R_4$ are hydrogen or alkyl, the alkyl groups containing together at least 4 carbon atoms.

7. A styryl dye according to claim 1 of the formula

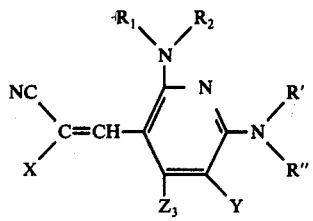

wherein X, Y, $R_1$, $R_2$, R' and R", have the same meanings as in claim 1 and $Z_3$ is alkyl of 1 to 5 carbon atoms or phenyl.

8. A styryl dyestuff according to claim 7, wherein Y is CN and $Z_3$ is methyl.

9. A styryl dyestuff according to claim 8 of the formula

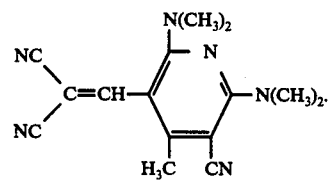

10. A styryl dyestuff according to claim 8 of the formula

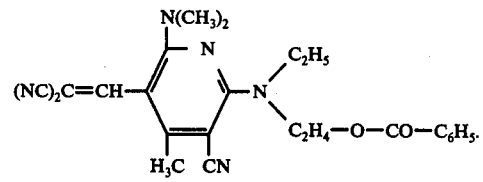

11. A styryl dyestuff according to claim 8 of the formula

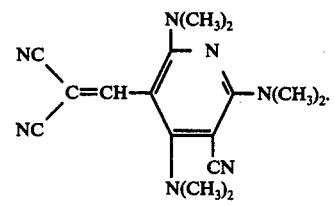

12. A styryl dyestuff according to claim 8 of the formula

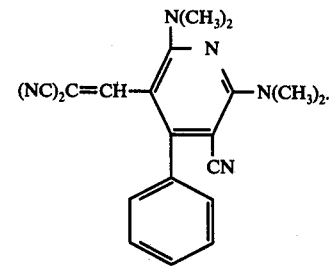

* * * * *